United States Patent [19]

Simpson

[11] 3,927,961

[45] Dec. 23, 1975

[54] DYEING AND MONOMER POLYMERIZATION IN PROTEIN FIBER WITH METAL CATALYST AND TRICHLOROACETIC ACID OR SALT THEREOF

[75] Inventor: William Stanley Simpson, Christchurch, New Zealand

[73] Assignee: Wool Research Organisation of New Zealand, Inc., Christchurch, New Zealand

[22] Filed: July 6, 1972

[21] Appl. No.: 269,398

[30] Foreign Application Priority Data

July 13, 1971 United Kingdom............. 32834/71
July 13, 1971 United Kingdom............. 32835/71

[52] U.S. Cl. ........................... 8/17; 8/54; 8/31; 117/141
[51] Int. Cl.² .................................. D06P 5/00
[58] Field of Search ......... 8/17, 31, 128 A; 117/141

[56] References Cited
UNITED STATES PATENTS

| | | | |
|---|---|---|---|
| 2,911,398 | 11/1959 | Vanderberg | 8/DIG. 18 |
| 3,083,118 | 3/1963 | Bridgeford | 8/DIG. 18 |
| 3,178,254 | 4/1965 | Hoelzle et al. | 8/54.2 |
| 3,232,692 | 2/1966 | Wilhelm et al. | 8/18 |
| 3,708,261 | 1/1973 | Kasper | 8/DIG. 8 |

OTHER PUBLICATIONS

Atkinson, J. Textile Institute, Vol. 55, No. 9, pp. T433–T447, 1964.

*Primary Examiner*—Donald Levy
*Attorney, Agent, or Firm*—Dennis P. Clarke; Harold L. Stowell

[57] ABSTRACT

This invention provides a combined dyeing and polymer deposition process for protein fibres. The fibres are treated in a liquid containing a dye, a polymerisable olefinic monomer and a catalyst in the form of a complex of copper, iron, chromium, manganese, vanadium, cobalt, nickel and aluminium together with a trihaloacetic acid or a salt or ester thereof. Other substances which can form trihalomethyl ions or free radicals in the presence of the complex can also be used. The combined catalyst of metal complex and trihaloacetic acid enables polymerisation of the monomer to be carried out in the presence of air and also permits formation of the polymer within the fibre substance rather than at the surface or in the liquid. The dye may be an acid, premetallised or reactive dye and is usually applied simultaneously with the polymer, for example by heating the fibres in an aqueous solution containing the reacting materials gradually from room temperature up to a temperature in the range 50° to 100°C and maintaining them at that temperature for between 30 minutes and 2 hours. The invention enables wool to be coloured and to have its physical and mechanical properties altered by polymer deposition in a single operation in a single bath, as well as ensuring that as much as possible of the polymer forms within the substance of the fibres.

9 Claims, No Drawings

DYEING AND MONOMER POLYMERIZATION IN PROTEIN FIBER WITH METAL CATALYST AND TRICHLOROACETIC ACID OR SALT THEREOF

The present invention relates to a process for dyeing protein fibres and forming polymers therein.

It has previously been proposed to form polymers within keratinic fibres. However, the catalysts employed in these processes are sensitive to atmospheric oxygen. Furthermore polymer forms in solution as well as within the fibres, so that the machinery employed eventually becomes clogged with polymer deposits which are difficult to remove. These difficulties have prevented the industrial application of the process.

As a result of research and experimentation we have discovered a combined dyeing and polymer deposition process for protein fibres which can be operated in the presence of air and in which a much higher proportion of the polymer forms within the fibres.

The present invention provides a combined dyeing and polymer deposition process for protein fibres which comprises applying to said fibres a water soluble or dispersible dyestuff, at least one polymerizable olefinic monomer, and a catalyst comprising a complexed copper, iron, chromium, manganese, vanadium, cobalt, nickel or aluminium compound and a substance which in the presence of said complexed compound can form trihalomethyl ions or free radicals, preferably a trihaloacetic, especially trichloroacetic, acid or an alkali metal ammonium or amine salt or ester thereof.

The dyestuff can be applied before, during or after the polymer deposition step. Preferably the process is carried out using a single treatment liquor, and most usually dyeing is carried out simultaneously with polymer deposition. The conditions for level dyeing are generally more critical than those for satisfactory polymer deposition, so that the conditions to be adopted for carrying out the simultaneous process will normally be determined by the requirements for level application of the dye. The process is normally carried out by heating the fibres in the presence of the dye, monomer and catalyst gradually from ambient temperature to a temperature in the range of 50°–100°C and maintaining them at that temperature for a period of 30 minutes – 2 hours.

The protein fibres are preferably keratinic fibres and may be in the form of fleeces, tops, card sliver, noils, yarns, threads, pile fabrics, non-woven fabrics and knitted goods. The keratinic fibres are preferably virgin or reclaimed sheep's wool but may also be derived from alpaca, cashmere, mohair, vicuna, guanaco, camel hair, and llama, or blends of these materials with sheep's wool. The material to be treated can consist either wholly of keratinic fibres or of blends of these fibres with synthetic fibrous or filamentary materials, such as polyamides, polyesters and polyacrylonitrile, and with cellulosic and regenerated cellulosic material. In general, however, the materials should contain at least 30% by weight of keratinous fibres and better results are obtained with 100% keratinous fibre-containing materials.

The complexing agents which form a component of the catalyst of the invention are preferably such as to form a chelate with the metal ion. An especially useful class of compounds is of the general formula:

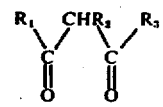

wherein $R_1$ and $R_3$ which may be the same or different each represent a substituted or unsubstituted alkyl, aryl or alkoxy group, $R_2$ represents a hydrogen atom or an alkyl group. Compounds of general formula I include acetylacetone which is preferred, hexafluoroacetylacetone, cyclohexane-1,3-dione, benzoylacetone and ethyl acetoacetate. Other agents which can be employed include salicylaldehyde, furfural, malonic acid, dipyridyl, and biguanide.

The metal chelate which is preferably a component of the catalyst of the invention can be applied to the fibres in aqueous solution or dissolved in an organic solvent, for example acetone. Copper acetylacetonate, for example is preferably applied as a solution in trichloroacetic acid or sodium trichloroacetate containing if desired a minor proportion of methanol. Any conventional method may be used to apply the chelate, for example padding or treatment in a bath.

A preferred method of applying the metal complex which can be used in aqueous solution comprises forming the complex in situ in the fibres.

In a further aspect the invention provides a process for polymer deposition within protein fibres which comprises forming a catalyst in situ in the fibres by treating them with a water-soluble copper, iron, chromium, manganese, vanadium, cobalt, nickel or aluminium compound, a complexing agent and a substance which in the presence of the metal chelate can form trihalomethyl ions or free radicals, preferably trichloroacetic acid or its alkali metal, ammonium or amine salts. A water-soluble salt of the metal and the complexing agent are applied to the fibres in either order and in separate steps, and the trichloroacetic acid is applied in admixture with either of them or in a third step. Preferably an excess of trichloroacetic acid is present in order to reduce the tendency of the metal acetylacetonate to precipitate. For example the fibres may be treated with an aqueous solution of copper sulphate and trichloroacetic acid and then with an aqueous emulsion containing the polymerisable monomers and acetylacetone.

When a metal acetylacetonate is applied to the fibre, it diffuses relatively slowly so that if the contact time between the fibre and the metal acetylacetonate solution is short the metal complex permeates only the outer layer of the fibre. The polymer subsequently forms in the outer layers of the fibre only, and the properties of the fibre which are most altered include the shrink-resistance, resistance to alkali damage, handle and abrasion-resistance. On more prolonged exposure to the metal acetylacetonate solution the metal complex diffuses throughout the fibre, and the subsequent polymer formation is more evenly spread over the fibre cross-section. In this case formation of polymer influences the tensile strength and bulking properties more than the surface properties. When the acetylacetonate is applied to wool, a contact time of 1 to 15 minutes at 20°C or correspondingly less at higher temperatures will enable the outer layers of the fibre to be treated, whereas a contact time of at least about 30 minutes at a temperature of 20°–100°C is required for complete permeation of the fibre. When the metal ion and acetylacetone are applied to the fibre in separate steps, the metal ion diffuses rapidly and subsequent polymer deposition is substantially more uniform across the fibre cross-section.

The catalyst which comprises the metal acetylacetonate and trichloroacetic acid is modified by absorption by the keratinic fibres which appear to act as sensitizers for the polymerisation. While the invention does not depend upon any theory as to its mode of operation, it is believed that the thiol groups derived from amino acids, especially cystine, in the wool are involved. Polymer formation is therefore substantially only on or within the keratinic fibres and little or no polymer may be formed in solution. This behaviour may be contrasted with the prior art processes in which unwanted polymer deposition in solution outside the keratinic fibres has been a major source of difficulty.

The process of the invention has the additional advantage that substantially complete exhaustion of the polymerisable olefinic monomers from aqueous solution onto the keratinic fibres can be achieved, thus giving economical use of the monomers and simplifying effluent treatment.

While the optimum metal concentration on the wool depends on a variety of factors, for example the metal being used, the monomers to be polymerised and the reaction conditions, a catalyst concentration of 10–5000 ppm calculated as metal acetylacetonate on the weight of fibre is normal. When using copper acetylacetonate, which is preferred, the concentration is preferably 10–400 ppm. In some situations it is convenient to impregnate wool with the catalyst as a first step and induce polymerisation at a later stage. Such an arrangement is suitable, for example, in continuous processing. When using a solution of copper acetylacetonate dissolved in a mixture of sodium trichloroacetate or trichloroacetic acid and methanol to impregnate the wool, the copper acetylacetonate is conveniently padded on in small amounts at a concentration in the range 0.001 to 0.1M, followed if desired by washing, and a similar concentration range is normally adopted when impregnating with aqueous copper sulphate solutions preceded or followed by acetylacetone.

The dyes should be selected in accordance with the use to which the treated fibres are to be put. The polymerisation reaction is normally carried out at a pH in the range 2–5 and any dye which will exhaust onto the wool from aqueous solution at a pH within that range is satisfactory. Such dyes are normally water soluble and contain anionic solubilising groups. Thus acid-levelling, acid milling, and pre-metallised dyes may be used in carpets and other uses which involve large quantities of dye. Reactive dyes may generally be used for garments, curtain fabrics and other uses in which the quantity of dye employed is less and a high degree of fastness to washing and/or dry-cleaning is required.

The acid dyes may be applied in the presence of about 10% Glaubers salt on the weight of fabric (o.w.f.) to promote level dyeing. The dye may be of the monoazo or polyazo type or may be a triphenylmethane or anthraquinone derivative. Acid milling dyes form a class of dyestuffs which have greater molecular weight and fewer solubilising groups than acid levelling dyes, though there is no rigid distinction between the two classes and many dyes have intermediate properties. Milling dyes are normally applied at a pH of 4–5 and about 10% Glauber's salt o.w.f. can be added if necessary. Premetallised dyes, which normally have o,o'-dihydroxyazo, o-amino-o'-hydroxyazo or o-carboxyl-o'-hydroxyazo groups coordinated to a metal atom, for example chromium or cobalt, may be employed as 1:1 or 1:2 complexes. When employing premetallised dyes, a higher copper concentration on the wool may be desirable in order to obtain satisfactory polymer deposition.

The dyes that may be employed include reactive dyes, i.e. those that react with the fibres and become covalently bonded to them, and such dyes give a high degree of fixation on the fibres. Dyestuffs falling within this class can incorporate the following groups:
epoxy-, ethylene-imino-, isocyanate-, isothiocyanate-, carbamic acid aryl ester-, propiolic acid amido-, mono-chloro- and dichloro- crotonylamino-, chloroacylamino-, acrylamino, sulpho halo-, sulphuric acid ester, sulphoxy-, labile halogen atoms, trichloropyridazino-, dichloroquinoxalino-, allyl-sulphonyl-, and certain reactive ammonium or hydroxonium residues.

Highly reactive dyes, for example, those incorporating a 2:4-dichlorotriazinyl-, vinyl sulphonyl-, 2:3-dichloroquinoxaline-, or bromo-acylamido group are also suitable.

Suitable acid levelling dyes are commercially available under the following tradenames:
Acrilan Yellow G (CI Acid Yellow 145), Lissamine Fast Scarlet R (CI Acid Red 240), Cibalan Bordeaux EL (CI Acid Red 251), Cibalan Brilliant Red BL (CI Acid Red 252), Alizarine Fast Blue FP (CI Acid Blue 176), Cibacrolan Blue 8G (CI Acid Blue 185), Alizarine Brilliant Sky Blue RCW (CI Acid Blue 204), Wool Fast Blue HFL (CI Acid Blue 213), Isolan Olive Green CG (CI Acid Green 66), Cibalan Red Brown RL (CI Acid Brown 226), Cibalan Black 2GL (CI Acid Black 107), Lissamine Fast Yellow 2G (CI Acid Yellow 17) (CI 18965), Alizarine Light Blue HRL (CI Acid Blue 182), Alizarine Cyanine Green G (CI Acid Green 25) (CI 61570), Fast Acid Yellow G (CI Acid Yellow 11) (CI 18820), Cibalan Orange RL (CI Acid Orange 88), Acid Fast Red 3G (CI Acid Red 57), Benzyl Red ROC (CI Acid Red 88) (CI 15620), Erio Fast Floxine KL (CI Acid Red 257), Erio Fast Blue 2GL (CI Acid Blue 40:1), Solophenyl Turquoise Blue GL (CI Direct Blue 86), Lissamine Fast Red B (CI Acid Red 37) (CI 17045), and Azo Rubinole 3GP (CI Acid Red 57).

Suitable milling dyestuffs include dyes available under the following tradenames:
Benzyl Fast Yellow GR (CI Acid Yellow 76), Wool Fast Blue B (CI Acid Blue 59), Alizarine Fast Violet 3R (CI Acid Blue 57), Irgalan Olive BGL (CI Acid Black 64), Alizarine Fast Blue 2B (CI Acid Blue 78), Alizarine Milling Green B (CI Acid Green 40), Irgalan Brown 3BC (CI Acid Brown 46), Alizarine Milling Blue SC (CI Acid Blue 150) (CI 61130), Polar Brilliant Red 3B (CI Acid Red 172) (CI 18125), Irganol Blue BS, Coomassie Red PG (CI Acid Red 95) (CI 22245), Brilliant Alizarine Milling Blue FBL (CI Acid Blue 227), Lanasyn Brilliant Yellow 5GL (CI Acid Yellow 127).

Suitable premetallised dyes which are commercially obtainable include:
Irgalan Yellow GL (CI Acid Yellow 114), Irgalan Grey BL (CI Acid Black 58), Lanasyn Red B1 (CI Acid Red 215), Neolan Yellow GR 21 (CI Acid Yellow 99) (CI 13900), Neolan Black 2G 14 (CI Acid Red 54) (CI 17020), Palatine Fast Yellow ELN (CI Acid Yellow 54) (CI 19010), Palatine Fast Green BL 15 (CI Acid Green 12) (CI 13425), Irganol Yellow 4G LS (CI Acid Yellow 79), Solilan Olive GL (CI Acid Orange 98) (CI 12965), C.1 Acid Green 6Z, Irgalan Brown GRL (CI Acid Brown 227), Carbolan Green G 125 (CI Acid Green 27) (CI 61580), Lanasyn Yellow 2RL (CI Acid Orange 80) and Neolan Red BRE (CI Acid Red 212).

Suitable commercially available reactive dyes include, for example, Procion Brilliant Red 11-3B (CI Reactive Red 3), Procion Brilliant Red M-5B (CI Reactive Red 2), Remazol Brilliant Blue R (CI Reactive Blue 19), Lanosol Blue 3R (CI Reactive Blue 50), Procion Navy Blue 11-3R (CI Reactive Blue 26), Levafix Brilliant Blue E-RL (CI Reactive Blue 44), Remalan Brilliant Blue B (CI Reactive Blue 36) and Lanasol Red 5B (CI Reactive Red 66), Lanasol Red 6G (CI Reactive Red 64), Lanasol Blue 3G (CI Reactive Blue 69) and Procilan Red G 200 (CI Reactive Red 72).

Chrome dyes, for example, Solochrome Black WDFA (CI Mordant Black 11) can also be used but require higher copper concentrations in the wool if a satisfactory degree of polymer deposition is to be obtained.

The polymerisable monomers which can be used are those which are polymerisable in keratinic fibre substance, and are preferably of the general formula:

$$CH_2 = CR_4 R_5 \quad (II)$$

wherein $R_4$ represents a hydrogen atom or a methyl or ethyl group and $R_5$ represents a halogen, especially chlorine, atom, a cyano group, a phenyl group, a group of the formula $—COHN_2$ or the group $—COOR_6$ wherein $R_6$ represents a $C_{1-3}$ alkyl or alkenyl group. Monomers giving especially good results include methyl methacrylate, allyl methacrylate, butyl acrylate, acrylonitrile and styrene. One or more polymerisable monomers may be used, and there may additionally be used one or more cross linking agents, for example allyl methacrylate mentioned above, and also N,N'-methylene-bisacrylamide, diallylamine or ethylene glycol dimethacrylate. Blends of, for example, styrene and butyl acrylate, methyl methacrylate and butyl acrylate, styrene and methyl methacrylate, styrene and acrylamide, styrene and methacrylic acid, methyl methacrylate and methacrylic acid, or methyl methacrylate and acrylamide may be copolymerised onto the wool with advantageous results. The amount of polymer incorporated is preferably 10–80% add-on on the weight of fibre, especially 40–50%, and these fibres have the most desirable properties.

The properties imparted to the polymer treated wool fibres depend upon the hardness of the polymer deposited therein. Hardnesses of different polymers may be related to their glass transition temperatures (Tg), i.e., the temperatures at which they change rapidly from a relatively rigid to a flexible state. The monomers deposited and their respective ratios may be selected according to the hardnesses desired. A hard polymer may impart a crisp resilient handle to wool for a carpet pile but may impair the elasticity sufficiently to make the treated wool difficult to spin. A soft polymer may impart a good handle but, if too much is applied, may make the wool limp and impair the soiling characteristics. Generally speaking the most satisfactory properties in the treated wool are obtained when the polymer deposited therein has a glass transition temperature of 0°–60°C (273°–333°K). For example polybutylacrylate is a soft polymer (Tg = 218°K) whereas polymethylmethacrylate (Tg = 378) and polystyrene (Tg = 373) are hard polymers. However, copolymers of 4 parts of polymethylmethacrylate or polysytrene to 1 part of polybutylacrylate have glass transition temperatures of 275°K and 330°K respectively and are within the preferred range.

Incorporation of large quantities of acidic groups, for example 50% add-on of methacrylic acid derived groups, can give the wool dye-resist properties, and smaller amounts give marked improvements in the anti-static and soil resist properties. Basic groups, for example acrylamide, can be incorporated and act as anti-static agents and confer differential dyeing properties.

The polymerisable monomer can be added directly if it is water-soluble, otherwise it is added as an aqueous emulsion using any convenient emulsifying agent.

Conventional machinery for dyeing textiles and garments with liquors may be used, including, for example, beam dyeing equipment, package dyeing machinery, hank dyeing machinery and top dyeing equipment.

As stated above the fibres can be treated at any stage during manufacture, but the treatment of loose wool appears to provide especial economic advantages. The wool can be formed into needle-bonded felts using, if required, a textile scrim as a support. The loose wool may also be formed into yarn, which can be woven or knitted into fabrics, including sliver-knit pile fabrics. Yarn may also be used in the manufacture of woven or tufted carpets, and such carpets exhibit improved wear-resistance.

It has been found that the polymer treatment of the invention improves the setting properties of the yarn, and this promises to be of particular importance in the field of carpet yarns where the setting properties are especially significant. The improved setting properties means that the treated fibres perform very satisfactorily in crimping. British Pat. No. 1,198,613 describes a method of producing textile fibres which comprises advancing an unfolded sliver of textile fibres at a first speed between a pair of first surfaces at least one of which is moving, allowing the sliver to pass unsupported through a folding zone between the output from the first surfaces and the intake to a pair of spaced substantially parallel second surfaces at least one of which is moving, and holding and conveying the folded fibres between the pair of second surfaces away from the folding zone at a second speed slower than the first, the folding zone being so short that the fibres are folded at the intake to the second surfaces into simple folds or waves having an amplitude and pitch dependent on the spacing between the spaced surfaces and the relationship of the second speed to the first. The process of this British Patent is especially advantageous because it minimizes fibre damage. Crimping can be carried out either before or after the treatment of the present invention. Modifications of the crimping process which can be used with advantage are described in British patent application Nos. 46104/68 and 7007/71.

The invention is illustrated by the following Examples.

EXAMPLE 1

New Zealand 48's quality fleece wool yarn spun on the semi-worsted system to a Dewsbury count of 2/75's, and having 3.5 turns per inch S-twist in the singles, and 3.5 turns per inch folding twist, in the Z direction was made up into 1 meter long hanks of 0.5 lb. weight. A weight of 30 lb. of the yarn hanks was loaded into a 35 lb. capacity "Plus-Flo" hank dyeing machine. The machine was closed by rubber bungs fitted to the sampling apertures. The machine was filled with water and the wool was scoured for 5 min. with 0.1% "Lissapol N," a non-ionic detergent, at 40°C. The water is passed alternatively up and down through the wool, 5 min. in each direction.

After scouring, methanol (150 g.), hydrated copper sulphate (30 g.) and Benzyl Red GR (CI Acid Red 85) (116 g.) were dissolved in 1.1 of water and Irgasol SW (25 cc), which is a dyestuff levelling agent, were added. The mixture was circulated through the wool while raising the temperature at about 2°C/min. to 68°C. When the temperature had reached 50°C, trichloroacetic acid (500 g.) in water was added. An emulsion of methyl methacrylate (11.5 lb.), butyl acrylate (3.5 lb.), acetylacetone (50 cc), Triton X 165 (1.5 lb.) an emulsifying detergent, and water (6.8 liters) was added. No further steam heating was required to maintain the desired temperature of 68°-72°C as the polymerisation was sufficiently exothermic to compensate for heat losses. After 1.5 hr. at this temperature the solution was sampled. Generally both the dyestuff and the monomers were completely exhausted, but if not the temperature was raised to 80°-95°C for 15 min. to complete the process. The machine was drained and the wool was then washed with cold water for a further 15 min., hydroextracted and dried.

Wood treated in this manner is found to have increased in weight by 14.7 lb. measured dry, representing 98% of the monomers consumed. The discrepancy between the amount of polymer deposited on the wool and the amount initially added can be explained by the presence of 2% impurity in the monomers.

Treated yarns were wound onto cones and used to tuft or weave carpets. Comparison of such carpets with those of similar construction and pile weight but of untreated wool yarns showed the treated yarns increase the abrasion resistance and wear life of the carpet.

The following dyes (referred to by their Colour Index number and chemical structure) have been successfully employed in place of Benzyl Red GR:

—Continued

| C.I. No. | Formula | Colour |
|---|---|---|
| 13361 | (structure: $O_2N$, OH, $NH_2$, N=N, $NaO_3S$, naphthalene) (as 1:1 chromium complex) | Green |
| 17605 | (structure: $OCH_3$, OH, N=N, $O_2N$, $NaO_3S$, NH–phenyl) | Brown |

EXAMPLE II

The procedure of Example 1 was repeated except that $CuSO_4.5H_2O$ was replaced by 50 gm. of $Fe(NO_3)_3.9H_2O$. The resultant increase in the weight of the yarn was 13.8 lb., representing 92% of the monomers consumed. The treated yarn was an orange-red shade.

EXAMPLE III

The procedure of Example II was followed except that at the conclusion of the combined dyeing and polymerisation treatment ethylene diamine tetra-acetic acid (40 g.) is added to counteract the effect of the ferric salt on the colour. The resultant yarn was bright orange-red and was as bright but slightly more orange than an untreated wool yarn containing the same amount of the same dyestuff.

EXAMPLE IV

A 25 g. sample of the scoured wool yarn of Example I was treated at a liquor ratio of 15:1 in a Jeffreys Laboratory Dyeing Machine with an aqueous solution containing:

| | | |
|---|---|---|
| Copper sulphate | 0.15% | on the weight of fibres (o.w.f.) |
| Acetylacetone | 0.15% | o.w.f. |
| Trichloroacetic acid | 1.5 | g/liter |
| Acetic acid | 3.0% | o.w.f. |
| Glauber's salt | 10.0% | o.w.f. |
| Erio Fast Blue 2GL | 1.0% | o.w.f. |

Erio Fast blue 2GL is an acid levelling dye manufactured by Ciba-Geigy A.G.

An aqueous emulsion having the following composition was then added:

| | |
|---|---|
| Methyl methacrylate | 40% o.w.f. |
| Butyl acrylate | 5% o.w.f. |
| Methacrylic acid | 5% o.w.f. |
| Dispersol PR | 2.5% o.w.f. |

Dispersol PR is an emulsifying agent manufactured by I.C.I. The mixture was heated to 100°C. over a period of 45 minutes and maintained at the boil for a further 40 minutes. At the end of this time all the monomers had polymerised within the wool, and the wool had been dyed a level blue colour.

The following further acid levelling dyes have been used in place of Erio Fast Blue with similar results:

| | |
|---|---|
| Lissamine Fast Yellow 2G | (I.C.I.) |
| Alizarine Light Blue HRL | (Sandoz) |
| Alizarine Cyanine Green G | (Bayer) |

EXAMPLE V

The method of Example IV was followed except that the Glauber's salt and Erio Fast Blue were omitted, and in their place was used 1% o.w.f. Irgasol SW (levelling agent), 1.2% o.w.f. Irgalan Yellow GL and 0.050% Irgalan Grey BL (premetallised dyes). Excellent yellow dyeing of the yarn was obtained with complete exhaustion of the monomers into the yarn.

EXAMPLE VI

The method of Example IV was followed except that the Glauber's salt and Erio Fast Blue were omitted and in their place was used 3% o.w.f. Lanasol Scarlet 2R (CI Reactive Red 78) (reactive dye) and 0.5% o.w.f. Albegal B. The monomer mixture was a 5:1 emulsion of styrene and butyl acrylate. The dyed yarn was washed off with 1% aqueous ammonia for 15 minutes at a liquor ratio of 1:15 to remove unreacted dye. A scarlet dyed yarn was produced with complete exhaustion of monomers onto the yarn.

The following fibre-reactive dyes (identified by Colour Index number and chemical formula) have been employed in place of Lanasol 2R:

| C.I. No. | Formula | Colour |
|---|---|---|
| 17916 | (structure with O–Metal–O, $NaO_3S$, N=N, $NaO_3S$, $NH_2$, triazine with Cl) | Black |
| 61205 | (anthraquinone structure with $SO_3H$, Cl, NH–phenyl–NH–triazine–Cl, $SO_3H$) | Blue |
| 18158 | ($SO_3Na$, OH, N=N, $NaO_3S$, NH–triazine with 2 Cl) | Red |
| 61200 | (anthraquinone with $NH_2$, $SO_3Na$, NH–phenyl–$SO_2CH_2CH_2OSO_3Na$) | Blue |

| C.I. No. | Formula | Colour |
|---|---|---|
| 26440 | 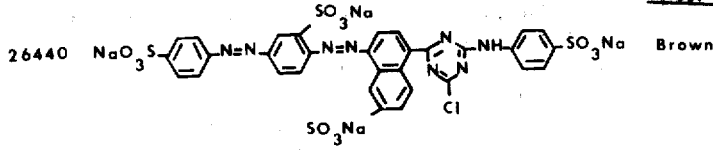 | Brown |
| 74460 | 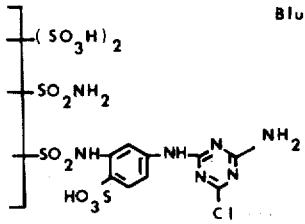 | Blue |
| 18852 | 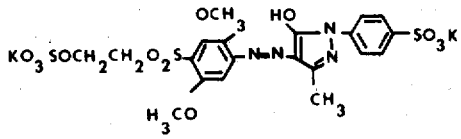 | Yellow |

EXAMPLE VII

A web of wool fibres is taken from a carding machine and needled to produce a consolidated web. 10 lb. of the latter is wound onto the beam of a beam dyeing machine and treated as in Example I, adjusting the quantity of all the chemicals in proportion to the sample size. The treated needlefelt is found to have increased in weight by 51%. Its abrasion resistance as measured in a WIRA Carpet Abrasion machine has increased 200% as compared to an untreated sample. Shrinkage tests in a 15 liter International Cubex washing machine indicated a reduction in area felting shrinkage from 42% to 7% after washing for 1 hour.

EXAMPLE VIII 30 lb. of clean New Zealand Crossbred 48's quality wool is loaded into a Celcon dyeing machine and treated exactly as in Example I. About 97–98% of the monomers are found to be polymerised inside the fibres.

EXAMPLE IX

25 G. of the scoured loose wool of Example II was treated at a liquor ratio of 15:1 in a Jeffreys machine with an aqueous solution containing:

| | |
|---|---|
| Copper sulphate | 0.72% o.w.f. |
| Acetylacetone | 0.15% o.w.f. |
| Trichloroacetic acid | 1.5 g/litre |
| Acetic acid | 4.0% o.w.f. |
| Glaubers salt | 10.0% o.w.f. |
| Solochrome Black PV | 5.0% o.w.f. |
| (CI Mordant Black 9) (I.C.I.) | |

The mixture was then treated with an aqueous monomer emulsion containing:

| | |
|---|---|
| Styrene | 50.0% o.w.f. |
| Butyl acrylate | 10.0% o.w.f. |
| Dispersol PR | 2.5% o.w.f. |

The contents of the machine were then raised to boiling over a period of 45 minutes and boiled for a period of 30 minutes. Formic acid (1% o.w.f.) was then added and boiling was continued for a further 30 minutes. Potassium dichromate (2% o.w.f.) was then added and the mixture was boiled for a further 30 minutes. The polymerisation was 95–90% of the theoretical and an excellent black shade on the fibres was produced.

The Example was repeated using Solochrome Black WDFA (Chrome dye) in place of Solochrome Black PV (premetallised dye) and again excellent results were obtained.

The following comparative experiments were carried out to determine which monomers could readily be polymerised in wool.

A suitable quantity of loose wool fibres was introduced into a number of test tubes, and an aqueous solution of the following composition was added.

| | |
|---|---|
| $CuSO_4.5H_2O$ | 0.075% o.w.f. |
| Acetylacetone | 0.15% o.w.f. |
| Trichloroacetic acid | 0.15% o.w.f. |
| Acetic acid | 0.05% o.w.f. |

The monomer was added directly if soluble in water, otherwise it was added as an aqueous emulsion, the liquor ratio in each sample tube was 15.1 and polymerisation was carried out for 1.5 hours at 70°C. The maximum polymer uptake in each case was 73% based on the dry weight of the fabric. The following results were obtained:

| Monomer | Percentage Conversion |
|---|---|
| Methyl methacrylate (MMA) | 99.5 |
| Allyl " | 93.5 |
| Butyl " | 91.0 |
| Methyl acrylate | 68.0 |
| Ethyl " | 60 |
| Butyl " (BA) | 82 |
| 2-Ethyl hexyl acrylate | 42.5 |
| Acrylic acid | 14.7 |
| Methacrylic acid | 58.5 |
| Itaconic acid | 7.5 |
| p-Styrene sulphonic acid | 0 |
| Cinnamic acid | 0 |
| Acrylonitrile | 35.0 |
| Styrene | 100 |
| Acrylamide | 36.5 |
| Methylolcrylamide | 36 |
| Methylene-bis-acrylamide | 21.5 |
| Allylamine | 0 |
| Diallylamine | 49.5 |
| Vinylacetate | 78 |

| Monomer -continued | Percentage Conversion |
|---|---|
| Glycol dimethacrylate | 44 |
| 1.1 MMA/Styrene | 98 |
| 4.1 Styrene/BA | 99 |
| 1.1 Acrylamide/Styrene | 62.5 |
| 1.1 Methacrylic acid/Styrene | 98 |
| 1.1 MMA/Methacrylic acid | 89 |
| 1.1 MMA/Acrylamide | 62.5 |

Any monomer which polymerised to an extent of 30% or more in the above system where there was no agitation is likely to be satisfactory as a major component in a commercial-scale treatment using a forced-flow system.

I claim:

1. A combined dyeing and polymer deposition process for protein fibers which comprises the steps of:
   applying to the fibers a dyestuff, at least one polymerizable olefinic monomer of the formula:
   $CH_2 = CR_5R_4$
   wherein $R_4$ represents hydrogen, methyl or ethyl and $R_5$ represents halogen, cyano, phenyl, $-CONH_2$ or $-COOR_6$ wherein $R_6$ represents an alkyl or alkenyl group of 1 to 3 carbon atoms,
   and a catalyst comprising a complex compound of at least one of the metals copper, iron, chromium, manganese, vanadium, cobalt, nickel or aluminum and trihaloacetic acid or a salt thereof,
   and causing said monomer to polymerize within said fibers.

2. A process according to claim 1 wherein the salt comprises an alkali metal, ammonium or amine salt.

3. A process according to claim 1 wherein dyeing and polymer deposition are carried out simultaneously in a single treatment liquor.

4. A process according to claim 1 wherein the fibres are heated in the presence of the dyestuff, the monomer and the catalyst gradually from ambient temperature to a temperature of 50°–100°C and are maintained at that temperature for a period of 30 minutes to 2 hours.

5. A process according to claim 1 wherein the complexed compound is formed with a chelating agent of the general formula

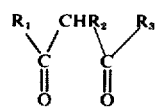

wherein $R_1$ and $R_3$ each represents a group selected from substituted and unsubstituted alkyl, aryl and alkoxy groups and $R_2$ represents a hydrogen atom or an alkyl group.

6. A process according to claim 4 wherein the chelating agent is copper acetylacetonate.

7. A process according to claim 1 including the step of forming said complex in situ in the protein fibres.

8. A process according to claim 1 wherein 10–80% of said monomer by weight based on the weight of the fibres is deposited within the fibres.

9. A process according to claim 1 wherein the polymer deposited in the wool has a glass transition temperature in the range 10°–60°C.

* * * * *